US012770239B2

(12) United States Patent
Ogura

(10) Patent No.: US 12,770,239 B2
(45) Date of Patent: Oct. 20, 2026

(54) OBJECT EVALUATION APPARATUS, OBJECT EVALUATION METHOD, AND NON-TRANSITORY COMPUTER-READABLE STORAGE MEDIUM

(71) Applicant: NEC Corporation, Tokyo (JP)

(72) Inventor: Kazumine Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 18/850,274

(22) PCT Filed: Apr. 6, 2022

(86) PCT No.: PCT/JP2022/017196

§ 371 (c)(1),
(2) Date: Sep. 24, 2024

(87) PCT Pub. No.: WO2023/195107

PCT Pub. Date: Oct. 12, 2023

(65) Prior Publication Data

US 2025/0217954 A1 Jul. 3, 2025

(51) Int. Cl.
*G06T 7/00* (2017.01)
*G06T 7/50* (2017.01)

(52) U.S. Cl.
CPC .......... *G06T 7/0002* (2013.01); *G06T 7/0004* (2013.01); *G06T 7/50* (2017.01);
(Continued)

(58) Field of Classification Search
None
See application file for complete search history.

(56) References Cited

U.S. PATENT DOCUMENTS

2018/0172436 A1* 6/2018 Isei ........................ G01B 5/003
2019/0362480 A1 11/2019 Diao et al.
(Continued)

FOREIGN PATENT DOCUMENTS

CN 108900546 A * 11/2018 ........... H04L 41/145
CN 112683924 A 4/2021
(Continued)

OTHER PUBLICATIONS

International Search Report for PCT Application No. PCT/JP2022/017196, mailed on Jun. 21, 2022.

*Primary Examiner* — Bernard Krasnic
(74) *Attorney, Agent, or Firm* — Sughrue Mion, PLLC

(57) ABSTRACT

A model acquisition unit acquires an evaluation model which is generated by setting, as learning data, some of a plurality of pieces of partial data generated by dividing three-dimensional data indicating a shape of an object into a plurality of pieces. An evaluation data generation unit generates, by using at least some of rest of the plurality of pieces of partial data as input data to evaluation model, evaluation data for evaluating whether the object has an anomaly. Three-dimensional shapes respectively indicated by at least two pieces of the partial data are identical within a range including a predetermined error. At least one of pieces of partial data of which three-dimensional shapes are identical with each other is included in first partial data for generating the learning data, and at least one other of pieces of partial data is included in second partial data to be the input data.

6 Claims, 12 Drawing Sheets

(52) U.S. Cl.
CPC ............... *G06T 2207/10028* (2013.01); *G06T 2207/20021* (2013.01); *G06T 2207/20081* (2013.01); *G06T 2207/30184* (2013.01)

(56) References Cited

U.S. PATENT DOCUMENTS

| | | | | |
|---|---|---|---|---|
| 2021/0019878 | A1* | 1/2021 | Iizawa | G06F 18/214 |
| 2023/0186606 | A1* | 6/2023 | Pan | G06V 10/774 382/159 |
| 2024/0386164 | A1* | 11/2024 | Duan | G06F 18/24133 |
| 2025/0104831 | A1* | 3/2025 | Park | G01N 21/88 |

FOREIGN PATENT DOCUMENTS

| | | | | | |
|---|---|---|---|---|---|
| CN | 114077689 | A | * | 2/2022 | G06Q 50/26 |
| JP | 2020-102111 | A | | 7/2020 | |
| KR | 101950681 | B1 | * | 2/2019 | G06T 7/11 |
| WO | 2020/031984 | A1 | | 2/2020 | |
| WO | 2021/111540 | A1 | | 6/2021 | |

* cited by examiner

FIG. 3

20

| OBJECT | THREE-DIMENSIONAL DATA |
|---|---|
| 1 | DATA 1 |
| 2 | DATA 2 |
| : | : |
| N | DATA N |

FIG. 4

20

| OBJECT | MODEL |
|---|---|
| 1 | MODEL 1 |
| 2 | MODEL 2 |
| : | : |
| N | MODEL N |

FIG. 11

NUMBER OF PIECES OF PARTIAL DATA: 3 (X, Y, Z)

| | FIRST PARTIAL DATA | SECOND PARTIAL DATA |
|---|---|---|
| FIRST TIME | X, Y | Z |
| SECOND TIME | X, Z | Y |
| THIRD TIME | Y, Z | X |
| FOURTH TIME | Z | X, Y |
| FIFTH TIME | Y | X, Z |
| SIXTH TIME | X | Y, Z |

OBJECT EVALUATION APPARATUS, OBJECT EVALUATION METHOD, AND NON-TRANSITORY COMPUTER-READABLE STORAGE MEDIUM

This application is a National Stage Entry of PCT/JP2022/017196 filed on Apr. 6, 2022, the contents of all of which are incorporated herein by reference, in their entirety.

TECHNICAL FIELD

The present invention relates to an object evaluation apparatus, an object evaluation method, and a storage medium.

BACKGROUND ART

Detection of an anomaly in an object by using three-dimensional data indicating a shape of the object has been studied. Especially, in recent years, detection of the anomaly by using a model trained by machine learning has been studied.

For example, Patent Document 1 describes generating a model in the following method. First, an image of a symmetrical part is extracted from a learning image acquired by imaging a body of a same type as an object to be inspected, and also divided images are generated by dividing the image of the symmetrical part into two parts in a symmetrical direction thereof. Next, further, an inverted image is generated by inverting each of the divided images. Further, an image of one side of the divided images and the inverted image acquired by inverting an image of the other side of the divided images are acquired as teaching data on one side of the symmetrical part of the object. Further, an image of the other side of the divided images and the inverted image acquired by inverting an image of the one side of the divided images are acquired as teaching data on the other side of the symmetrical part of the object. Then, by performing machine learning based on the acquired teaching data, a model to be used in appearance inspection of the object.

RELATED DOCUMENT

Patent Documents

Patent Document 1: Japanese Patent Application Publication No. 2020-102111

SUMMARY OF INVENTION

Technical Problem

In the above-described Patent Document 1, symmetry of an object is used for increasing the number of pieces of teaching data. Meanwhile, depending on an object type, the number of objects with an anomaly is small. In this case, in the method described in Patent Document 1, the number of pieces of teaching data with an anomaly may be insufficient, and as a result, accuracy of a model may not be sufficiently increased.

One example of an object of the present invention is, in view of the above-described problem, to provide an object evaluation apparatus, an object evaluation method, and a storage medium that are capable of detecting an anomaly with high accuracy, even in a case where an object rarely has the anomaly.

Solution to Problem

According to one aspect of the present invention, an object evaluation apparatus is provided, including:

a model acquisition unit that acquires an evaluation model generated by setting, as learning data, a part of a plurality of pieces of partial data generated by dividing three-dimensional data indicating a shape of an object into a plurality of pieces; and an evaluation data generation unit that generates, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data.

According to one aspect of the present invention, an object evaluation method is provided, including, by a computer:

acquiring an evaluation model generated by setting, as learning data, a part of a plurality of pieces of partial data generated by dividing three-dimensional data indicating a shape of an object into a plurality of pieces; and generating, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data.

According to one aspect of the present invention, a computer-readable storage medium is provided, the storage medium storing a program causing a computer to include:

a model acquisition function of acquiring an evaluation model generated by setting, as learning data, a part of a plurality of pieces of partial data generated by dividing three-dimensional data indicating a shape of an object into a plurality of pieces; and an evaluation data generation function of generating, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the least two pieces of partial data is included in second of the partial data to be the input data.

Advantageous Effects of Invention

According to one aspect of the present invention, an object evaluation apparatus, an object evaluation method, and a storage medium that are capable of detecting an anomaly with high accuracy, even in a case where an object rarely has the anomaly, can be provided.

BRIEF DESCRIPTION OF THE DRAWINGS

FIG. 3 It is a diagram illustrating a first example of information stored in a storage unit.

FIG. 4 It is a diagram illustrating a second example of the information stored in the storage unit.

FIG. 11 It is a diagram for describing a second example of the processing performed by the object evaluation apparatus.

EXAMPLE EMBODIMENT

In the following, an example embodiment of the present invention is described with reference to the drawings. Note that, in all the drawings, a similar component is denoted with a similar reference sign, and description thereof is omitted as appropriate.

Figure 1:
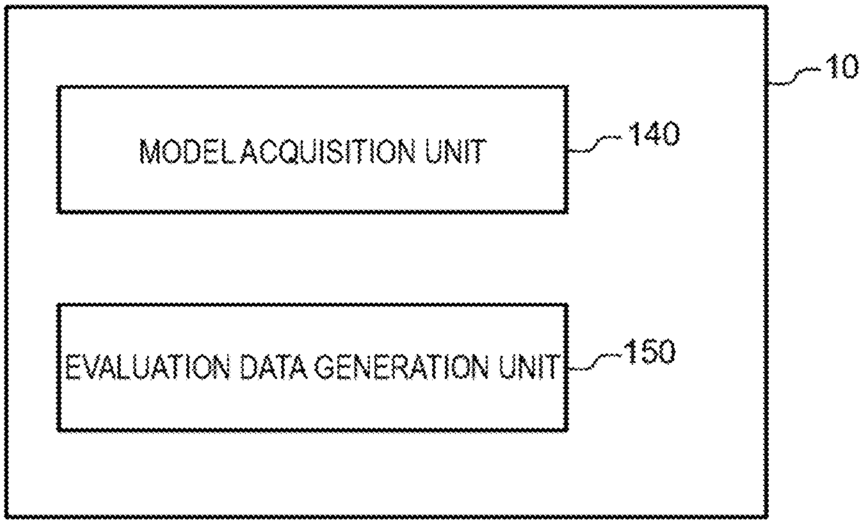
FIG. 1 It is a diagram illustrating an outline of an object evaluation apparatus according to an example embodiment.

FIG. 1 is a diagram illustrating an outline of an object evaluation apparatus 10 according to the example embodiment. The object evaluation apparatus 10 includes a model acquisition unit 140 and an evaluation data generation unit 150. The model acquisition unit 140 acquires an evaluation model. The evaluation model is generated by setting, as learning data, a part of a plurality of pieces of partial data generated by dividing three-dimensional data indicating a shape of an object into a plurality of pieces. The evaluation data generation unit 150 generates, by using at least a part of rest of the plurality of pieces of partial data as input data to the evaluation model, evaluation data for evaluating whether the object has an anomaly. Three-dimensional shapes respectively indicated by at least two pieces of the partial data are identical in a range including a predetermined error. Further, at least one of the pieces of partial data of which three-dimensional shapes are identical is included in first partial data for generating the learning data, and at least one other of the pieces of partial data is included in second partial data to be the input data.

According to the object evaluation apparatus 10, there is no need to prepare teaching data in advance. Further, the three-dimensional shape of the at least one piece of the first partial data for generating the evaluation model and the three-dimensional shape if the at least one piece of second partial data for generating the evaluation data are identical within a range including the predetermined error. Thus, it is possible to detect an anomaly with high accuracy, even in a case where the object rarely has the anomaly.

In the following, a detailed example of the object evaluation apparatus 10 is described.

Figure 2:
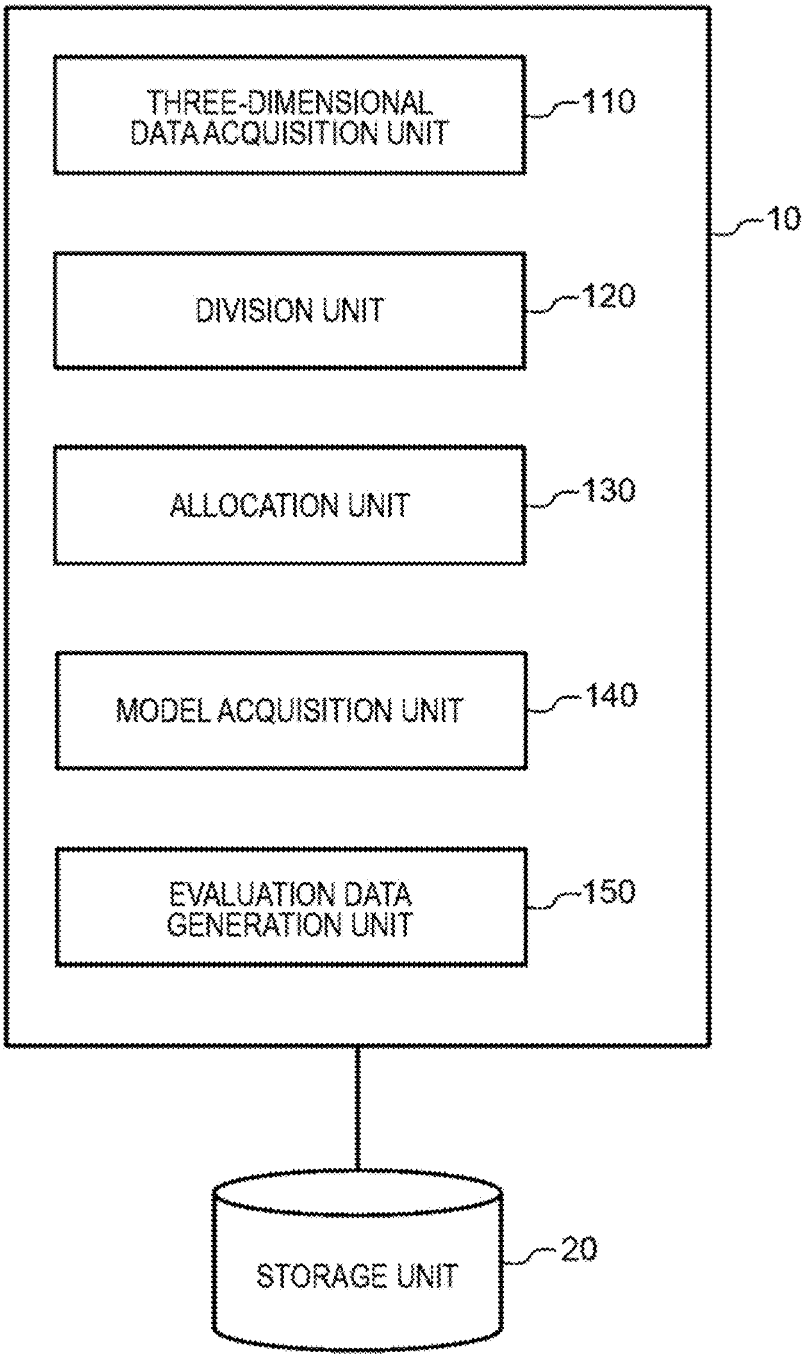
FIG. 2 It is a diagram illustrating one example of a functional configuration of the object evaluation apparatus.

FIG. 2 is a diagram illustrating one example of a functional configuration of the object evaluation apparatus 10. The object evaluation apparatus 10 includes, in addition to the above-described model acquisition unit 140 and the evaluation data generation unit 150, a three-dimensional data acquisition unit 110, a division unit 120, and an allocation unit 130, and is used in conjunction with a storage unit 20. Note that, the storage unit 20 may be a part of the object evaluation apparatus 10.

The object evaluation apparatus 10 is, for example, a server, or may be a terminal.

The storage unit 20 stores three-dimensional data indicating a shape of an object. The three-dimensional data are, for example, a result of measurement by LiDAR, specifically, point cloud data, or may be generated by using an image capturing the object.

The object is, for example, a structure such as a bridge, an overpass, a building, and a tunnel, or may be a product manufactured in a factory. In a case where there are a plurality of types of object, the storage unit 20 stores three-dimensional data for each of the plurality of types of object. For example, the storage unit 20 stores three-dimensional data for each of a plurality of bridges (or for each of tunnels, for each of buildings, for each of overpasses). Further, in a case where a plurality of times of measurement are performed on the same object, three-dimensional data are generated each time the object is measured. Further, the storage unit 20 stores the plurality of pieces of three-dimensional data for each object.

The three-dimensional data acquisition unit 110 acquires three-dimensional data from the storage unit 20. In a case where the storage unit 20 stores a plurality of pieces of three-dimensional data, the three-dimensional data acquisition unit 110 acquires three-dimensional data of an object being to be confirmed whether the object has an anomaly in current processing.

The division unit 120 divides the three-dimensional data acquired by the three-dimensional data acquisition unit 110 into a plurality of pieces of partial data. As described with reference to FIG. 1, three-dimensional shapes respectively indicated by at least two pieces of the partial data are identical within a range including a predetermined error. It is desirable that the division unit 120 divides the three-dimensional data in such a way that there is at least one other piece of the partial data, for any piece of the partial data, with an identical shape. Herein, regarding the predetermined error, in a case where the divided data include a predetermined shape such as a plane or a spherical surface, other piece of data may include the predetermined shape, for example, a plane or a spherical surface. Further, the number of points, an area, and a volume may differ slightly among pieces of the divided data. A specific example of processing performed by the division unit 120 is described in the following with reference to another diagram.

Note that, the division unit 120 may set a part of the three-dimensional data acquired from the three-dimensional data acquisition unit 110 as data to be a source of the partial data. For example, in a case where a piece of the three-dimensional data is a bridge, the three-dimensional data acquisition unit 110 may set a part corresponding to a pier of the bridge as data to be a source of the partial data.

The allocation unit 130 allocates the plurality of pieces of partial data generated by the division unit 120 to first partial data for generating an evaluation model and second partial data for generating evaluation data. As described above, the other piece of the partial data with an identical shape is present for any piece of the partial data. Further, the allocation unit 130 sets part of the plurality of pieces of partial data as the first partial data, and sets rest of the pieces of partial data as the second partial data. Thereby, at least one of at least two pieces of partial data of which three-dimensional shapes are identical is included in the first partial data, and rest of the at least two pieces of partial data is included in the second partial data.

The model acquisition unit 140 generates an evaluation model by using the first partial data. A type of machine learning used in the evaluation model is an autoencoder or a generative adversarial network.

Note that, the model acquisition unit 140 may store the generated evaluation model in the storage unit 20. In a case where the storage unit 20 stores three-dimensional data for each of a plurality of objects, the model acquisition unit 140 causes the evaluation model to be stored for each of the plurality of objects.

The evaluation data generation unit 150 generates evaluation data by inputting the second partial data to the evaluation model generated by the model acquisition unit 140. In a case where an autoencoder is used in the evaluation model, the evaluation data become data indicating a three-dimensional shape. Then, the evaluation data generation unit 150 decides whether there is an anomaly in a part of the object corresponding to the second partial data by using a difference between a shape indicated by the second partial data and a shape indicated by the evaluation data. For example, in a case where the difference is equal to or more than a reference value, the evaluation data generation unit 150 decides that there is an anomaly in the part of the object corresponding to the second partial data.

For example, it is considered a case where the three-dimensional data are point cloud data. Second partial data S is a set of a plurality of point clouds, and evaluation data S' also becomes a set of a plurality of point clouds. In a case where S is set as the following equation (1) and S^ is set as the following equation (2), the evaluation data generation unit 150 computes a difference by using the following equation (3), and, in a case where the difference is equal to or more than the reference value, decides that a part corresponding to the second partial data has an anomaly.

[Math. 1]

$$S=\{x_1, \ldots, x_n\} \tag{1}$$

[Math. 2]

$$\hat{S}=\{\hat{x}_1, \ldots, \hat{x}_n\} \tag{2}$$

[Math. 3]

$$R_i=\frac{\min_{\hat{x}\in\hat{S}}\|x_i-\hat{x}\|_2^2}{\max_j \min_{\hat{x}\in\hat{S}}\|x_j-\hat{x}\|_2^2} \tag{3}$$

In a case where the evaluation model is stored in the storage unit 20, the evaluation data generation unit 150 reads the evaluation model from the storage unit 20. In a case where the storage unit 20 stores the evaluation model for each of a plurality of objects, the evaluation data generation unit 150 acquires, from the storage unit 20, the evaluation model for an object being a target of current processing.

FIG. 3 is a diagram illustrating a first example of information stored in the storage unit 20. In the example illustrated in the present diagram, the storage unit 20 stores three-dimensional data for each of a plurality of objects.

FIG. 4 is a diagram illustrating a second example of the information stored in the storage unit 20. In the example illustrated in the present diagram, the storage unit 20 stores the evaluation model for each of the plurality of objects.

Figure 5:
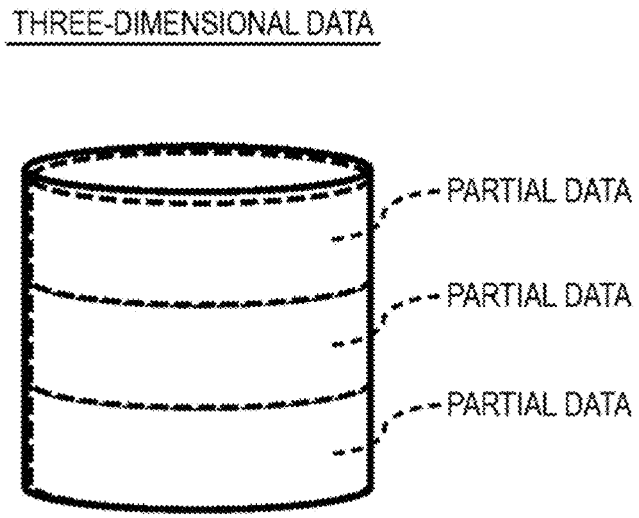
FIG. 5 It is a diagram illustrating a first example of processing performed by a division unit.

FIG. 5 is a diagram illustrating first example of processing performed by the division unit 120. In the example illustrated in the present diagram, three-dimensional data have translational symmetry. Further, the division unit 120 generates a plurality of pieces of partial data by dividing the three-dimensional data in a plane perpendicular to an axial direction of transitional symmetry (a vertical direction in the example illustrated in the present diagram). In the example illustrated in the present diagram, the three-dimensional data are divided into three pieces of partial data, but the three-dimensional data may be divided into two pieces of partial data, or may be divided into four or more pieces of partial data.

Figure 6:
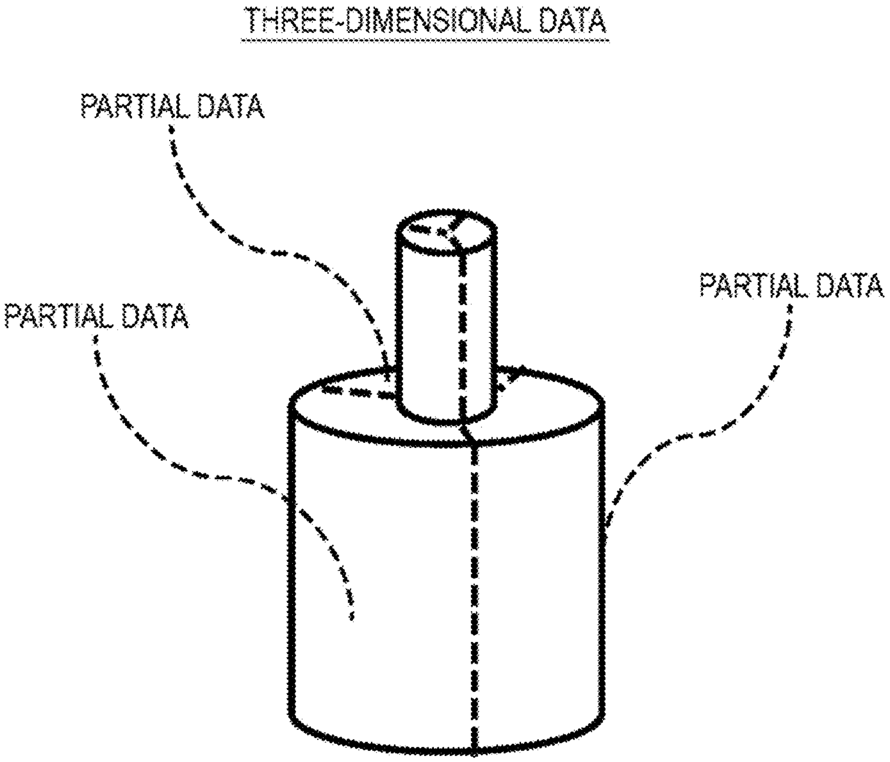
FIG. 6 It is a diagram illustrating a second example of the processing performed by the division unit.

FIG. 6 is a diagram illustrating a second example of the processing performed by the division unit 120. In the example illustrated in the present diagram, three-dimensional data have rotational symmetry. Further, the division unit 120 generates a plurality of pieces of partial data by dividing the three-dimensional data into a plurality of pieces by identical angles (for example, 360°/n: n is an integer) with a rotation axis of rotational symmetry as a rotation center. Also in the example illustrated in the present diagram, the three-dimensional data are divided into three pieces of partial data, but the three-dimensional data may be divided into two pieces of partial data, or may be divided into four or more pieces of partial data.

Further, in a case where the three-dimensional data have mirror-image symmetry, the division unit 120 may generate a plurality of pieces of partial data by using the mirror-image symmetry.

Note that, even in a case where the three-dimensional data do not have symmetry as an entire shape, when the three-dimensional data is divided into a plurality of parts, at least one part may have symmetry. In this case, the division unit 120 may generate a plurality of pieces of partial data by dividing the three-dimensional data into a plurality of parts and then dividing each part into a plurality of pieces. Note that, processing of dividing the three-dimensional data into the plurality of parts may be performed manually.

Figure 7:
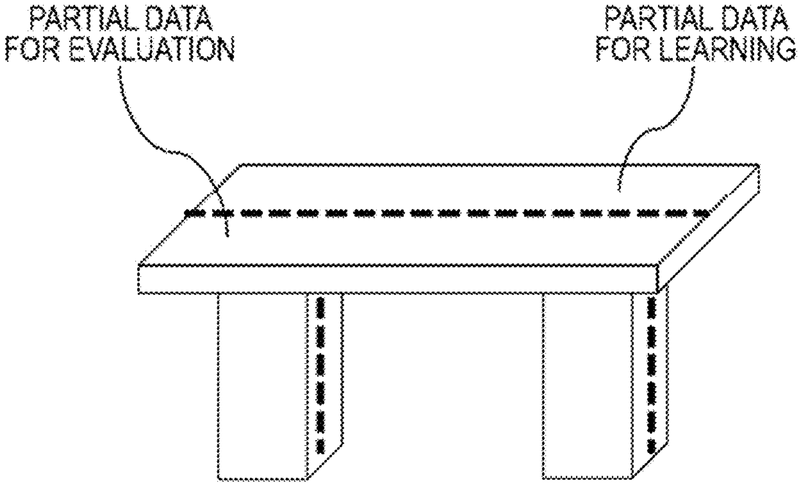
FIG. 7 It is a diagram for describing a first example of processing performed by an allocation unit.

FIG. 7 is a diagram for describing a first example of processing performed by the allocation unit 130. In the example illustrated in the present diagram, the division unit 120 generates two pieces of partial data. Shapes indicated by the two pieces of partial data are identical to each other. Further, the allocation unit 130 sets one of the two pieces of partial data as first partial data, specifically, partial data for learning, and sets the other one as second partial data, specifically, partial data for evaluation.

Figure 8:
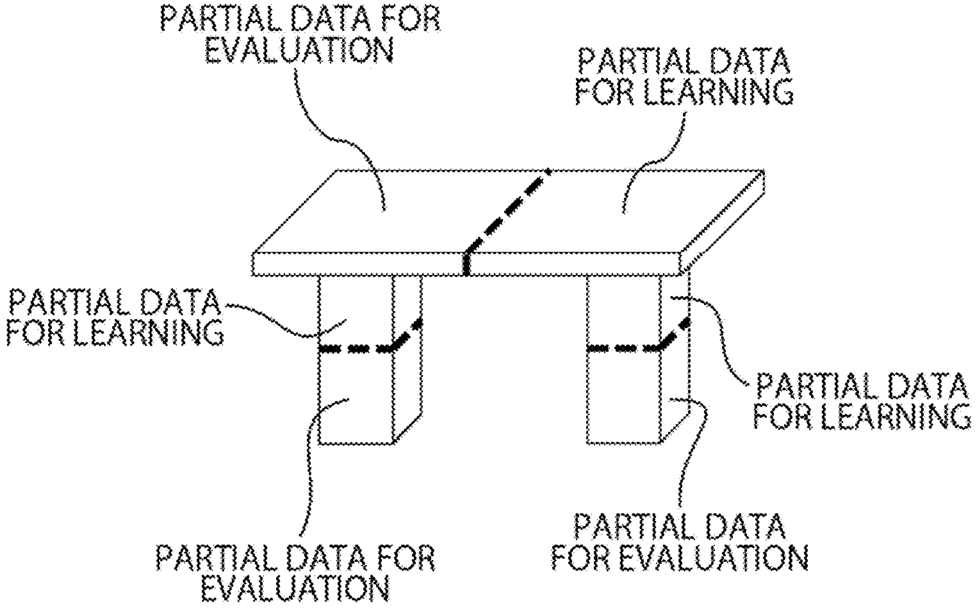
FIG. 8 It is a diagram for describing a second example of the processing performed by the allocation unit.

FIG. 8 is a diagram for describing a second example of the processing performed by the allocation unit 130. In the example illustrated in the present diagram, the division unit 120 generated a plurality of pieces of partial data by dividing the three-dimensional data into a plurality of parts each having symmetry, and by further dividing the plurality of parts. Further, the allocation unit 130 allocates, for each of the plurality of parts, partial data for learning, specifically, first partial data, and partial data for evaluation, specifically, second partial data. For example, in a case where a plurality of pieces of partial data are generated from a part corresponding to a bridge pier, the allocation unit 130 allocates the plurality of pieces of partial data to the first partial data and the second partial data. Further, in a case where a plurality of pieces of partial data are generated from a part corresponding to a bridge floorboard, the allocation unit 130 allocates the plurality of pieces of partial data to the first partial data and the second partial data.

Figure 9:
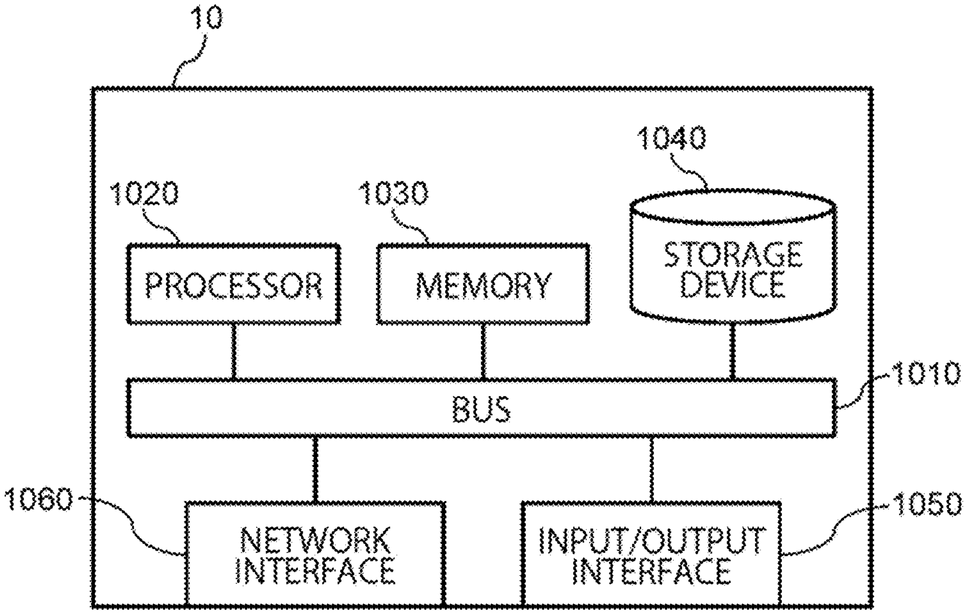
FIG. 9 It is a diagram illustrating a hardware configuration example of the object evaluation apparatus.

FIG. 9 is a diagram illustrating an example of a hardware configuration of the object evaluation apparatus 10. The object evaluation apparatus 10 includes a bus 1010, a processor 1020, a memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to mutually transmit and receive data to and from one another. However, a method for connecting the processor 1020 and the like with one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a removable medium such as a memory card, a read only memory (ROM), or the like, and includes a storage medium. The storage medium of the storage device 1040 stores a program module achieving each function of the object evaluation apparatus 10 (for example, the three-dimensional data acquisition unit 110, the division unit 120, the allocation unit 130, the model acquisition unit 140, and the evaluation data generation unit 150). The processor 1020 reads each of the program modules onto the memory 1030 and executes the program module, and thereby each function related to the program module is achieved. Further, the storage device 1040 may function as the storage unit 20.

The input/output interface 1050 is an interface for connecting the object evaluation apparatus 10 to various input/output devices.

The network interface 1060 is an interface for connecting the object evaluation apparatus 10 to a network. The network is, for example, a local area network (LAN) or a wide area network (WAN). A method for connecting the network interface 1060 to the network may be wireless connection, or may be wired connection.

Figure 10:
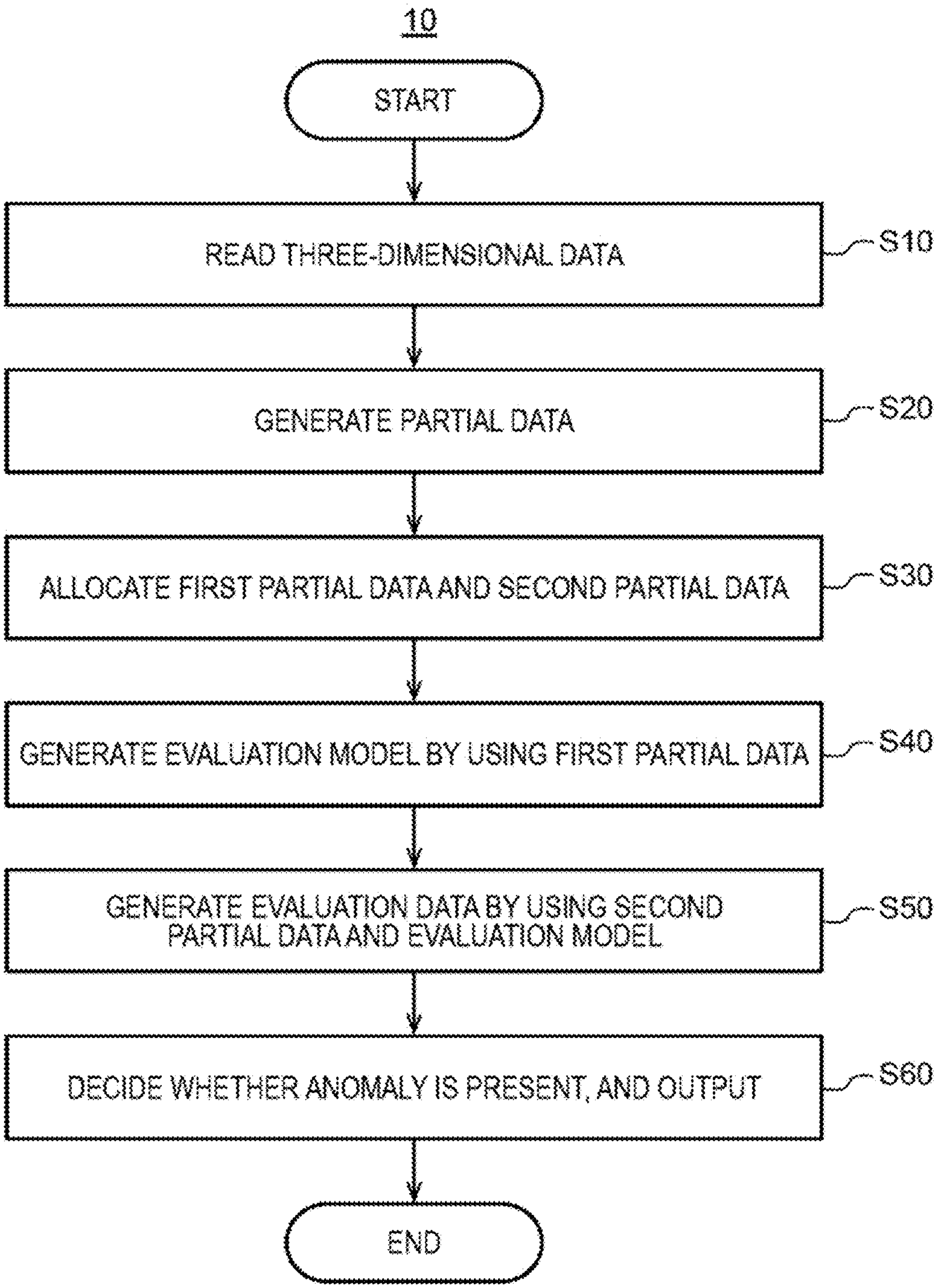
FIG. 10 It is a flowchart illustrating a first example of processing performed by the object evaluation apparatus.

FIG. 10 is a flowchart illustrating a first example of processing performed by the object evaluation apparatus 10. A user of the object evaluation apparatus 10 determines an object to be an evaluation target, and inputs information indicating the object to the object evaluation apparatus 10. Then, the three-dimensional data acquisition unit 110 reads three-dimensional data of the object from the storage unit 20 (step S10).

Then, the division unit 120 generates a plurality of pieces of partial data, by using the three-dimensional data acquired by the three-dimensional data acquisition unit 110 (step S20). Next, the allocation unit 130 allocates the plurality of pieces of partial data to first partial data and second partial data (step S30). Then, the model acquisition unit 140 generates an evaluation model by using the first partial data (step S40).

After that, the evaluation data generation unit 150 generates evaluation data by inputting the second partial data to the evaluation model (step S50). Then, the evaluation data generation unit 150 decides, by using the evaluation data, whether an anomaly of the object is present at a time when the three-dimensional data are generated, and outputs a result of the decision (step S60). Note that, in a case where the object evaluation apparatus 10 is a server, a destination of the output is a terminal. Meanwhile, in a case where the object evaluation apparatus 10 is a terminal, a destination of the output is a display or a printing apparatus.

FIG. 11 is a diagram for describing a second example of the processing performed by the object evaluation apparatus 10. In this example, with respect to at least two pieces of partial data of which three-dimensional shapes are identical to each other, the allocation unit 130, the model acquisition unit 140, and the evaluation data generation unit 150 repeat generation of the evaluation model and generation of the evaluation data, while changing a combination of data included in the first partial data and data included in the second partial data. Further, the evaluation data generation unit 150 determines a part of the object where an anomaly is present, by using a plurality of pieces of the evaluation data.

For example, in the example illustrated in FIG. 11, three pieces of partial data X, Y, and Z are generated. Shapes of the three pieces of partial data are identical to each other. In this case, the allocation unit 130, the model acquisition unit 140, and the evaluation data generation unit 150 performs generation of the evaluation model and generation of the evaluation data six times.

Specifically, in a first time, the first partial data are X and Y, and the second partial data are Z. In a second time, the first partial data are X and Z, and the second partial data are Y. In a third time, the first partial data are Y and Z, and the second partial data are X. In a fourth time, the first partial data are Z, and the second partial data are X and Y. In a fifth time, the first partial data are Y, and the second partial data are X and Z. In a sixth time, the first partial data are X, and the second partial data are Y and Z.

Figure 12:
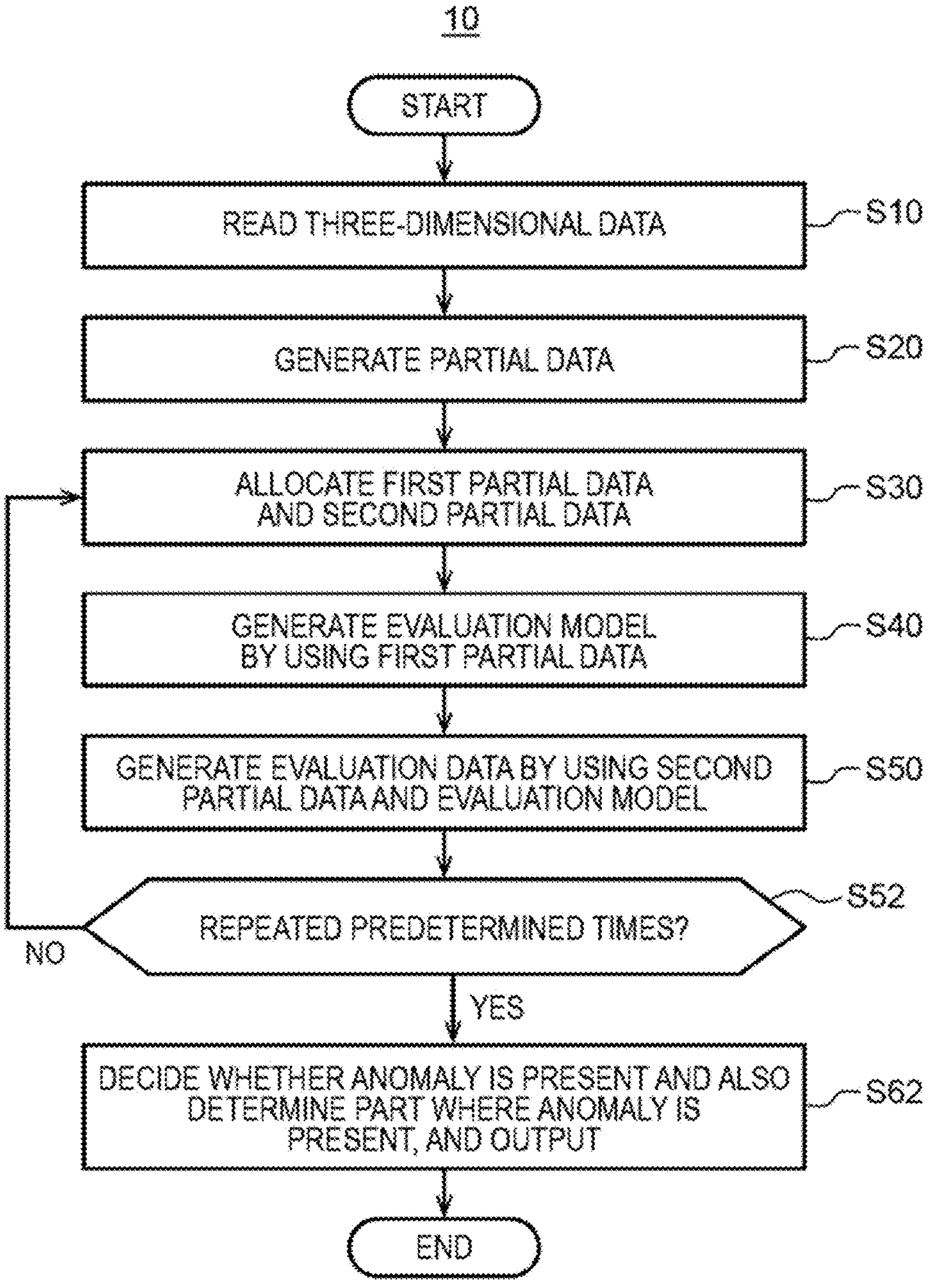
FIG. 12 It is a flowchart illustrating one example of processing performed by the object evaluation apparatus.

Further, the evaluation data generation unit 150 computes, in each time, a difference between a shape based on the second partial data and a shape based on the evaluation data. For example, in all the first time, the fifth time, and the sixth time, evaluation is performed on Z. Further, data learned in those times are different for each time. In a case where it is decided in any evaluation that Z has an anomaly, it is decided that it is highly likely that there is an anomaly in a part corresponding to Z. Likewise, for Y, whether an anomaly is present is decided based on results of the second time, the fourth time, and the sixth time. For X, whether an anomaly is present is decided based on results of the third time, the fourth time, and the fifth time. FIG. 12 is a flowchart illustrating one example of processing performed by the object evaluation apparatus 10 in the example illustrated in FIG. 11. The example illustrated in the present diagram is similar to the processing described with reference to FIG. 10, except for the following points.

First, the object evaluation apparatus 10 repeatedly performs the processing from step S30 to step S50 for a predetermined number of times (step S52). The predetermined number of times is set within a range in which a combination of the first partial data and the second partial data can be changed.

Then, the evaluation data generation unit 150 decides whether there is an anomaly of an object by using a plurality of pieces of the evaluation data, and in a case where an anomaly is present, determines a part where the anomaly is present. Then, the evaluation data generation unit 150 outputs a result of the decision and a result of the determination (step S62).

Thus, according to the present example embodiment, the division unit 120 divides at least a part of pieces of three-dimensional data of an object into a plurality of pieces of partial data. Shapes indicated by the plurality of pieces of partial data are identical within a range including a predetermined error. Further, the model acquisition unit 140 generates an evaluation model by using part of the pieces of partial data. Further, the evaluation data generation unit 150 generates evaluation data by using rest of the pieces of partial data. By using the evaluation data, whether there is an anomaly in a part of the object corresponding to the pieces of partial data can be decided. Therefore, by using the object evaluation apparatus 10, it is possible to decide whether there is an anomaly in the object, without preparing teaching data in advance.

While the example embodiment of the present invention has been described with reference to the drawings, the example embodiment is an exemplification of the present invention, and various configurations other than the above-described configuration can also be employed.

Further, in a plurality of flowcharts referred to in the above description, a plurality of steps (pieces of processing) are described in order, but execution order of the steps executed in each example embodiment is not limited to the described order. In each example embodiment, the illustrated order of the steps may be changed to an extent that contents thereof are not interfered. Further, each of the above-described example embodiments may be combined to an extent that contents thereof do not conflict with each other.

A part or the entirety of the above-described example embodiment may be described as the following supplementary notes, but is not limited thereto.

1. An object evaluation apparatus including:

a model acquisition unit that acquires an evaluation model generated by setting, as learning data, a part of a plurality of pieces of partial data generated by dividing three-dimensional data indicating a shape of an object into a plurality of pieces; and an evaluation data generation unit that generates, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data.

2. The object evaluation apparatus according to the above described 1, further including:

a division unit that divides the three-dimensional data into the plurality of pieces of partial data; and an allocation unit that allocates the plurality of pieces of partial data to the first partial data and the second partial data, wherein the model acquisition unit generates the evaluation model by using the learning data including the first partial data.

3. The object evaluation apparatus according to the above described 2, wherein, with respect to the at least two pieces of partial data of which three-dimensional shapes are identical to each other, the allocation unit, the model acquisition unit, and the evaluation data generation unit repeat generation of the evaluation model and generation of the evaluation data, while changing a combination of data included in the first partial data and data included in the second partial data, and the evaluation data generation unit determines, by using a plurality of pieces of the evaluation data, a part of the object where an anomaly is present.

4. The object evaluation apparatus according to any one of the above described 1 to 3, wherein the object is at least a part of a structure.

5. The object evaluation apparatus according to any one of the above described 1 to 4, wherein the evaluation model uses an autoencoder.

6. The object evaluation apparatus according to any one of the above described 1 to 5, wherein the evaluation model is generated for each of a plurality of the objects, and the model acquisition unit acquires the evaluation model related to the object.

7. An object evaluation method including, by a computer:

acquiring an evaluation model generated by setting, as learning data, a part of a plurality of pieces of partial data generated by dividing three-dimensional data indicating a shape of an object into a plurality of pieces; and generating, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data.

8. The object evaluation method according to the above described 7, further including, by the computer:

dividing the three-dimensional data into the plurality of pieces of partial data;

allocating the plurality of pieces of partial data to the first partial data and the second partial data; and generating the evaluation model by using the learning data including the first partial data.

9. The object evaluation method according to the above described 8, further including, by the computer:

with respect to the at least two pieces of partial data of which three-dimensional shapes are identical to each other, repeating generation of the evaluation model and generation of the evaluation data, while changing a combination of data included in the first partial data and data included in the second partial data; and determining, by using a plurality of pieces of the evaluation data, a part of the object where an anomaly is present.

10. The object evaluation method according to any one of the above described 7 to 9, wherein the object is at least a part of a structure.

11. The object evaluation method according to any one of the above described 7 to 10, wherein the evaluation model uses an autoencoder.

12. The object evaluation method according to any one of the above described 7 to 11, wherein the evaluation model is generated for each of a plurality of the objects, the method further including, by the computer, acquiring the evaluation model related to the object.

13. A computer-readable storage medium storing a program causing a computer to include:

a model acquisition function of acquiring an evaluation model generated by setting, as learning data, a part of a plurality of pieces of partial data generated by dividing three-dimensional data indicating a shape of an object into a plurality of pieces; and an evaluation data generation function of generating, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data.

14. The storage medium according to the above described 13, wherein the program further causes the computer to include a division function of dividing the three-dimensional data into the plurality of pieces of partial data, and an allocation function of allocating the plurality of pieces of partial data to the first partial data and the second partial data, and the model acquisition function generates the evaluation model by using the learning data including the first partial data.

15. The storage medium according to the above described 14, wherein, with respect to the at least two pieces of partial data of which three-dimensional shapes are identical to each other, the allocation function, the model acquisition function, and the evaluation data generation function repeat generation of the evaluation model and generation of the evaluation data, while changing a combination of data included in the first partial data and data included in the second partial data, and the evaluation data generation function determines, by using a plurality of pieces of the evaluation data, a part of the object where an anomaly is present.

16. The storage medium according to any one of the above described 13 to 15, wherein the object is at least a part of a structure.

17. The storage medium according to any one of the above described 13 to 16, wherein the evaluation model uses an autoencoder.

18. The storage medium according to any one of the above described 13 to 17, wherein the evaluation model is generated for each of a plurality of the objects, and the model acquisition function acquires the evaluation model related to the object.

19. The program according to any one of the above described 13 to 18.

REFERENCE SIGNS LIST

10 Object evaluation apparatus
20 Storage unit
110 Three-dimensional data acquisition unit
120 Division unit
130 Allocation unit
140 Model acquisition unit
150 Evaluation data generation unit

What is claimed is:

1. An object evaluation apparatus comprising:

at least one memory storing instructions; and at least one processor configured to execute the instructions to:

acquire an evaluation model generated by setting, as learning data, a part of a plurality of pieces of partial data generated by dividing three-dimensional data indicating a shape of an object into a plurality of pieces; and generate, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data, wherein the at least one processor is further configured to execute the instructions to:

divide the three-dimensional data into the plurality of pieces of partial data;

allocate the plurality of pieces of partial data to the first partial data and the second partial data; and generate the evaluation model by using the learning data including the first partial data, wherein the at least one processor is further configured to execute the instructions to:

with respect to the at least two pieces of partial data of which three-dimensional shapes are identical to each other, repeat allocation of the partial data, generation of the evaluation model, and generation of the evaluation data, while changing a combination of data included in the first partial data and data included in the second partial data; and determine, by using a plurality of pieces of the evaluation data, a part of the object where an anomaly is present.

2. The object evaluation apparatus according to claim 1, wherein the object is at least a part of a structure.

3. The object evaluation apparatus according to claim 1, wherein the evaluation model uses an autoencoder.

4. The object evaluation apparatus according to claim 1, wherein the evaluation model is generated for each of a plurality of the objects, and the at least one processor is further configured to execute the instructions to acquire the evaluation model related to the object.

5. An object evaluation method comprising, by a computer:

acquiring an evaluation model generated by setting, as learning data, a part of a plurality of pieces of partial data generated by dividing three-dimensional data indicating a shape of an object into a plurality of pieces; and generating, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data, wherein the method further comprises:

dividing the three-dimensional data into the plurality of pieces of partial data;

allocating the plurality of pieces of partial data to the first partial data and the second partial data; and generating the evaluation model by using the learning data including the first partial data, wherein the method further comprises:

with respect to the at least two pieces of partial data of which three-dimensional shapes are identical to each other, repeat allocating the partial data, generating the evaluation model, and generating the evaluation data, while changing a combination of data included in the first partial data and data included in the second partial data; and determining, by using a plurality of pieces of the evaluation data, a part of the object where an anomaly is present.

6. A non-transitory computer-readable storage medium storing a program causing a computer to execute:

acquiring an evaluation model generated by setting, as learning data, a part of a plurality of pieces of partial data generated by dividing three-dimensional data indicating a shape of an object into a plurality of pieces; and generating, by using at least a part of rest of the plurality of pieces of partial data as input data to the evaluation model, evaluation data for evaluating whether the object has an anomaly, wherein three-dimensional shapes respectively indicated by at least two pieces of the partial data are identical within a range including a predetermined error, and at least one of the at least two pieces of partial data of which three-dimensional shapes are identical to each other is included in first of the partial data for generating the learning data, and at least one other of the at least two pieces of partial data is included in second of the partial data to be the input data wherein the computer further executes:

dividing the three-dimensional data into the plurality of pieces of partial data;

allocating the plurality of pieces of partial data to the first partial data and the second partial data; and generating the evaluation model by using the learning data including the first partial data, wherein the computer further executes:

with respect to the at least two pieces of partial data of which three-dimensional shapes are identical to each other, repeat allocating the partial data, generating the evaluation model, and generating the evaluation data, while changing a combination of data included in the first partial data and data included in the second partial data; and determining, by using a plurality of pieces of the evaluation data, a part of the object where an anomaly is present.

* * * * *